US011842544B2

(12) United States Patent
Wang et al.

(10) Patent No.: US 11,842,544 B2
(45) Date of Patent: Dec. 12, 2023

(54) AUTOMATIC PERSPECTIVE TRANSFORMATION

(71) Applicant: FUJITSU LIMITED, Kawasaki (JP)

(72) Inventors: Nannan Wang, Allen, TX (US); Xi Wang, Murphy, TX (US); Paparao Palacharla, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 225 days.

(21) Appl. No.: 17/339,815

(22) Filed: Jun. 4, 2021

(65) Prior Publication Data

US 2022/0391623 A1    Dec. 8, 2022

(51) Int. Cl.
*G06V 20/56* (2022.01)
*G06N 20/00* (2019.01)

(52) U.S. Cl.
CPC ............. *G06V 20/56* (2022.01); *G06N 20/00* (2019.01)

(58) Field of Classification Search
CPC ........ G06V 20/56; G06V 20/58; G06V 10/26; G06V 10/82; G06V 20/00; G06V 10/25; G06N 20/00; G06T 3/00
See application file for complete search history.

(56) References Cited

U.S. PATENT DOCUMENTS

| 5,808,623 A * | 9/1998 | Hamburg | G06T 3/00 345/619 |
| 11,107,228 B1 * | 8/2021 | Shrivastava | G06T 11/00 |
| 2018/0189580 A1 * | 7/2018 | Lee | G06V 20/582 |
| 2019/0147221 A1 * | 5/2019 | Grabner | G06T 19/006 382/103 |
| 2019/0311546 A1 * | 10/2019 | Tay | G05D 1/0088 |
| 2019/0317519 A1 * | 10/2019 | Chen | G06T 7/344 |
| 2020/0334494 A1 * | 10/2020 | Gautam | G06F 18/253 |
| 2022/0261593 A1 * | 8/2022 | Yu | G06N 3/088 |
| 2022/0358770 A1 * | 11/2022 | Guler | G06T 7/50 |

FOREIGN PATENT DOCUMENTS

| CN | 111985316 A | * | 11/2020 |
| CN | 112396569 A | * | 2/2021 |

OTHER PUBLICATIONS

Multi-View Fusion-Based 3D Object Detection for Robot Indoor Scene Perception—2019 (Year: 2019).*
DV-Net: Dual-view network for 3D reconstruction by fusing multiple sets of gated control point clouds—2020 (Year: 2020).*
Poly-Yolo: Higher Speed, More Precise Detection and Instance Segmentation for YOLOV3—2020 (Year: 2020).*

* cited by examiner

*Primary Examiner* — Nizar N Sivji
(74) *Attorney, Agent, or Firm* — Maschoff Brennan

(57) ABSTRACT

A method may include obtaining an image of a scene from a first perspective, the image including an object, and detecting the object in the image using a machine learning process, where the object may be representative of a known shape with at least four vertices at a first set of points. The method may also include automatically predicting a second set of points corresponding to the at least four vertices of the object in a second perspective of the scene based on the known shape of the object. The method may additionally include constructing, without user input, a transformation matrix to transform a given image from the first perspective to the second perspective based on the first set of points and the second set of points.

17 Claims, 7 Drawing Sheets

AUTOMATIC PERSPECTIVE TRANSFORMATION

FIELD

Embodiments of the present disclosure relate to automatic perspective transformation.

BACKGROUND

Converting a perspective of an image can be an involved and computationally expensive task. There are some circumstances it may be helpful to take one perspective, and convert it to another, such as to observe a real distance between two objects in a picture.

SUMMARY

One or more embodiments of the present disclosure may include a method that includes obtaining an image of a scene from a first perspective, the image including an object, and detecting the object in the image using a machine learning process, where the object may be representative of a known shape with at least four vertices at a first set of points. The method may also include automatically predicting a second set of points corresponding to the at least four vertices of the object in a second perspective of the scene based on the known shape of the object. The method may additionally include constructing, without user input, a transformation matrix to transform a given image from the first perspective to the second perspective based on the first set of points and the second set of points.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

The present disclosure relates to the automatic generation of a perspective transformation matrix to transform an image to a desired perspective. For example, a first image may be used to generate a second image of the same scene from another perspective, like a top down perspective or a front-view perspective, which can be useful for measuring true ground distance between two articles in the image. To automatically derive the perspective transformation matrix, a known object of known shape and relative dimension may be identified in the initial object using machine learning, and a projection of the vertices of the known shape in the desired perspective may be estimated. Using the two sets of points (the vertices from the original image of the scene and the vertices in the desired perspective), the perspective transformation matrix may be solved for without user input. The perspective transformation matrix may be used to transform the perspective of an image. In some embodiments, multiple known objects and/or multiple images may be used.

Certain embodiments of the present disclosure may provide improvements over previous iterations of machine vision and true distance measurements. For example, by utilizing machine learning to detect objects and generate the perspective transformation matrix, the process may be more efficient and more streamlined, reducing the amount of computing resources required. Also, typical transformation matrix derivation techniques are laborious and require manual checking, reassessing, and adjusting a transformation matrix. Such an approach is costly, labor-intensive, and not fast enough for emerging technologies such as self-driving vehicles, drones, monitoring social distancing, augmented reality displays, etc. Additionally, certain embodiments of the present disclosure may improve accuracy of true distance measurements, which may be important to self-driving vehicles, drones, monitoring social distancing, augmented reality displays, and other circumstances. Enhancing the accuracy in these areas may improve a user experience, or even the viability of a given market or product.

One or more example embodiments are explained with reference to the accompanying drawings.

Figure 1:
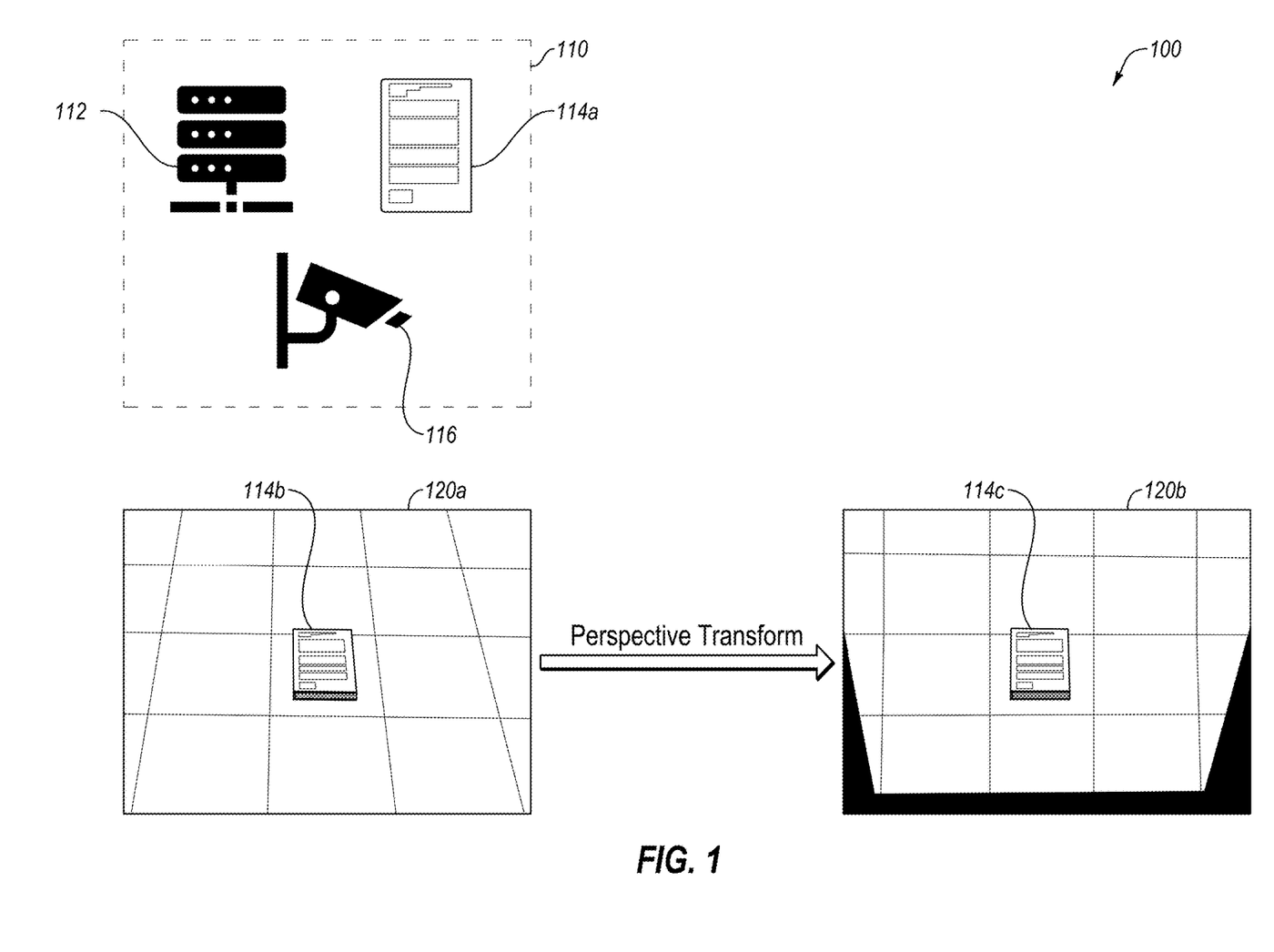
FIG. 1 is a diagram illustrating an example system that performs a perspective transformation.

FIG. 1 is a diagram illustrating an example system 100 that performs a perspective transformation, in accordance with one or more embodiments of the present disclosure. The system 100 may include a computing device 110 that includes a database 112 of known objects, such as the object 114, and an image capturing device 116. The image capturing device 116 may capture an image 120 that includes one of the known objects, such as the object 114. The system 100 may perform a perspective transform on the image 120a to arrive at a different perspective in the image 120b.

In operation, the computing device 110 may capture the image 120 with the object 114 using the image capturing device 116. The image capturing device 116 may include any device for capturing images, such as a camera (e.g., a charge-coupled device (CCD), a complementary metal-oxide semiconductor (CMOS) sensor, an n-type metal oxide semiconductor field effect transistor (NMOS), etc.) or any other image capturing device. The image capturing device 116 may include a monocular camera or other image capturing device in which an image is captured from a single perspective. The image 120 may include the object 114.

The object 114 may include an object of a known relative dimension and shape, as stored in the database 112. In these and other embodiments, the object 114 may include at least four vertices, with at least three of the vertices as non-collinear vertices. For example, the object 114 illustrated in FIG. 1 is a book with a known ratio of length to height in a rectangular shape. The object 114a as stored in the database 112 may represent the object 114 with known relative dimensions and relative location of vertices of the object 114. The object 114b may represent the object 114 in the first image 120a from a first perspective, and the object 114c may represent the object 114 from a different perspective after performing perspective transformation on the image 120a to derive the second image 120b.

In operation, the computing device 110 may perform image analysis on the image 120 to find and/or otherwise detect one or more known objects in the image 120, such as the object 114. For example, the computing device 110 may act as a machine vision system to obtain an image and perform instance segmentation to identify each instance of each unique object in the image. In these and other embodiments, the computing device 110 may utilize a deep neural network (DNN) based image analysis technique, such as a mask region convolutional neural network (R-CNN), a You Only Look At CoefficienTs (YOLACT), and/or other types of neural network image analysis techniques to operate as a machine vision system.

After identifying objects within the image 120 (such as the object 114), for known objects, the vertices of the known object may be identified in the image 120. Using the vertices and the known relative dimensions of the object, a second set of coordinate points may be automatically constructed for a desired perspective (e.g., for a top-down perspective). For example, the pixel distance between the vertices based on the known relative dimensions may be used to generate the second set of coordinate points. Using the two sets of at least four coordinate points (e.g., the set of vertices from the original image and the constructed set of vertices in the desired perspective), a perspective transformation matrix may be determined. The perspective transformation matrix may include a 3×3 matrix represented by $$\begin{bmatrix} a_{11} & a_{12} & a_{13} \\ a_{21} & a_{22} & a_{23} \\ a_{31} & a_{32} & a_{33} \end{bmatrix}$$

where $a_{11}$, $a_{12}$, $a_{21}$, and $a_{22}$ represent the components for linear transformation, $a_{31}$ and $a_{32}$ represent the components for translation, $a_{13}$ and $a_{23}$ represent the components for perspective transformation, and $a_{33}=1$. The matrix may be solved for using an equation:

$$[x'\ y'\ w'] = [u\ v\ w] \begin{bmatrix} a_{11} & a_{12} & a_{13} \\ a_{21} & a_{22} & a_{23} \\ a_{31} & a_{32} & a_{33} \end{bmatrix}$$

where (u, v, w) represents the original coordinate points and (x', y', w') represents the transformed coordinate points. Using the two sets of four vertices, the entire perspective transformation matrix may be solved. In some embodiments, the prediction of the second set of points and/or the derivation of the perspective transformation matrix may be performed automatically (e.g., may be performed without user input or without user-instructed calculation, etc.). For example, a user may not be required to manually select and input the first set of vertices or the second set of vertices.

Using the solved-for perspective transformation matrix, the image 120a may be transformed into the image 120b. For example, as illustrated in FIG. 1, the image 120a from an elevated perspective is transformed into the image 120b with a top-down perspective. Additionally or alternatively, a front-view perspective may be desired.

In some embodiments, after solving for the perspective transformation matrix, the transformed image (e.g., the image 120b) may be used to analyze information or other objects in the image. For example, true ground distance between objects may be measured after the image is transformed to a top-down perspective. The true ground distance may be beneficial in areas like monitoring social distancing, determining relationships between autonomous vehicles, lane detection techniques for self-driving cars, etc. One example of performing such a transformation and/or measurement may be described with greater detail in FIG. 5.

In some embodiments, multiple images and/or multiple objects may be detected in the image 120. For example, if there are multiple known objects as stored in the database 112 that are identified in the image 120, each distinct object may have its own perspective transformation matrix derived, and the multiple perspective transformation matrices may be combined to determine a final perspective transformation matrix. Additionally or alternatively, multiple images may be captured and each image may be independently and/or automatically processed with perspective transformation matrices derived. Each of the perspective transformation matrices may be combined into the final perspective transformation matrix. In some embodiments, each of the individual images may include multiple objects such that the perspective transformation matrix for a given image may represent the combination across all objects, which is then combined across all images. One example of performing such a transformation utilizing multiple images and/or objects may be described with greater detail in FIG. 6.

When observed experimentally, when performing the perspective transformation based on a single object and a single image, the accuracy was approximately 85%. When performing the perspective transformation based on multiple objects and a single image, the accuracy was approximately 91%. When performing the perspective transformation based on multiple objects across multiple images, the accuracy was approximately 93%.

Modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented within other systems or contexts than those described. For example, the system 100 may include any number of images 120 and/or objects 114 that may be used to facilitate perspective transformation.

Figure 2A:
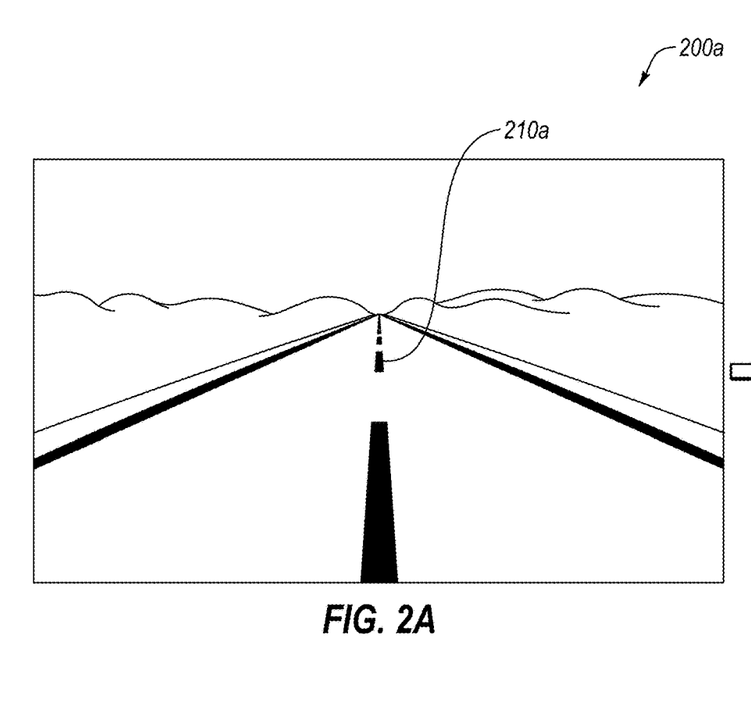
FIGS. 2A and 2B are an example of a perspective transformation.
Figure 2B:
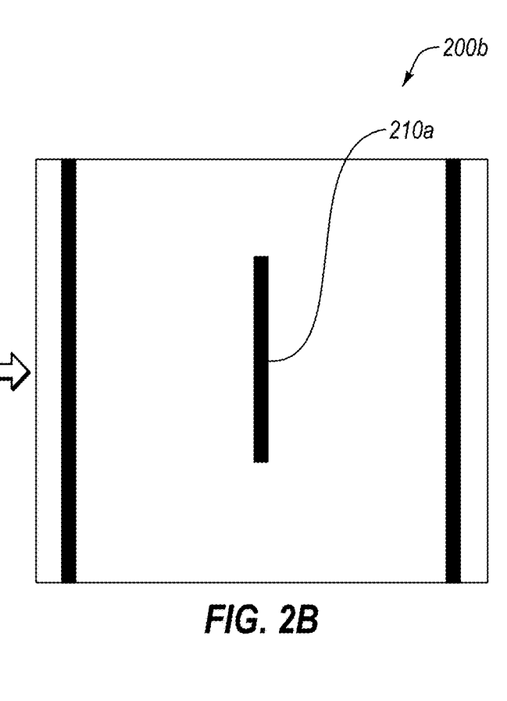

FIGS. 2A and 2B are an example of a perspective transformation, in accordance with one or more embodiments of the present disclosure. For example, FIG. 2A illustrated a first captured image 200a that is transformed into a second image 200b illustrated in FIG. 2B. As illustrated in FIG. 2A, an object 210a (representative of a lane marker on a roadway) may be detected, with a relative dimension of the lane marker being known. Using the perspective transformation described in the present disclosure, the perspective of the first image 200a may be shifted to a top-down perspective in the second image 200b. Using the top-down perspective obtained in the image 200b, a true ground distance of a driving vehicle relative to the lane marker 210a may be determined.

In the context of a moving camera, such as that illustrated in FIGS. 2A and 2B, two adjacent images may be treated as having come from the perspective, or even multiple images if the image capturing device has a high enough frame rate. For example, for a vehicle traveling at 30 miles per hour, if the image capturing device is capable of capturing images at 240 frames per second, the vehicle would travel approximately two inches between images.

Figure 3A:
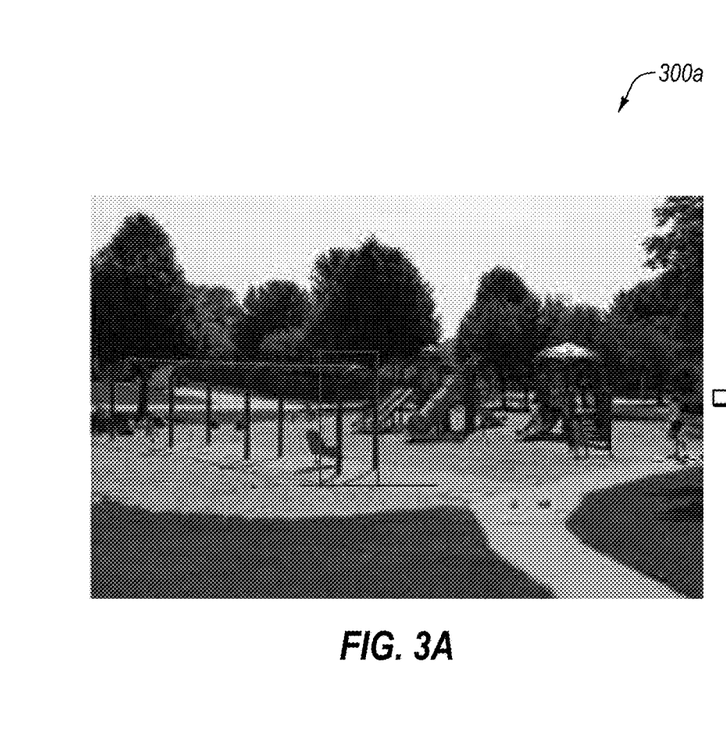
FIGS. 3A and 3B are another example of a perspective transformation.
Figure 3B:
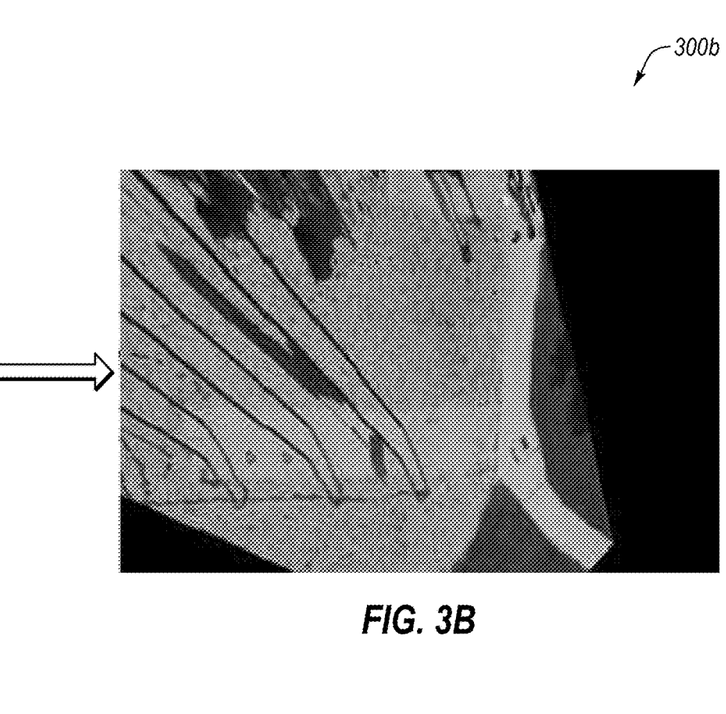

FIGS. 3A and 3B are another example of a perspective transformation, in accordance with one or more embodiments of the present disclosure. For example, FIG. 3A illustrated a first captured image 300a that is transformed into a second image 300b illustrated in FIG. 3B. Using the perspective transformation described in the present disclosure, the perspective of the first image 300a may be shifted to a top-down perspective in the second image 300b. Using the top-down perspective obtained in the image 300b, a true ground distance may be determined. For example, for people at the park a measure of social distancing may be monitored (e.g., for compliance with health mandates).

Modifications, additions, or omissions may be made to the examples illustrated in FIGS. 2A-3B without departing from the scope of the disclosure. For example, the designations of different elements in the manner described is meant to help explain concepts described herein and is not limiting. Further, the examples are illustrative and any other number of examples are also contemplated as within the scope of the present disclosure.

Figure 4:
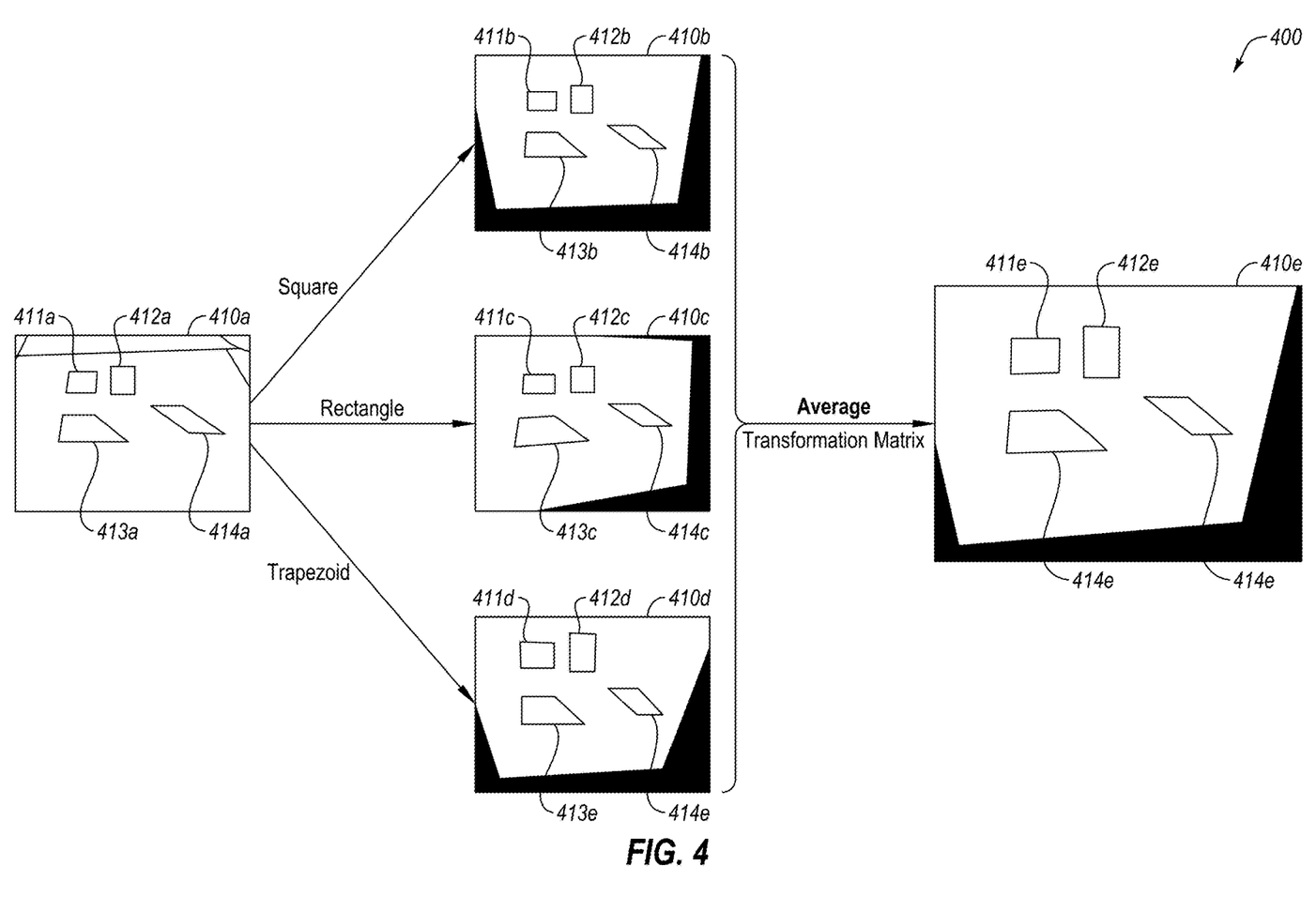
FIG. 4 illustrates an example of perspective transformation utilizing multiple known objects.

FIG. 4 illustrates an example operation 400 of perspective transformation utilizing multiple known objects, in accordance with the present disclosure. For example, as illustrated in FIG. 4, an initial image 410a (or set of images) may include a square 411a as one known object, a rectangle 212a as a second object, a trapezoid 413a as a third object, and any number of objects, such as a parallelogram 414a.

In operation, a computing device (such as the computing device 110 of FIG. 1) may capture the image 410a and identify the square 411a, rectangle 212a, and trapezoid 413a in the image 410a. Based on the known relative dimensions of the square 411a, the computing device may derive a perspective transformation matrix based on using the square 411a as the known object to transform the image 410a into the image 410b (including the square 411b, the rectangle 412b, the trapezoid 413b, and the parallelogram 414b). If multiple images are captured in conjunction with the image 410a, the perspective transformation matrices using the square 411 may be performed for multiple images, including all of the images. In these and other embodiments, the perspective transformation matrices using the square 411 as the known object may be combined (e.g., by averaging the values of the various matrix components).

A similar process may be followed using the rectangle 412a. For example, the computing device may utilize the rectangle 412a of known relative dimensions to derive the perspective transformation matrix, producing the image 410c with the square 411c, the rectangle 412c, the trapezoid 413c, and the parallelogram 414c. If multiple images are captured in conjunction with the image 410a, the perspective transformation matrices using the rectangle 412 may be performed for multiple images, including all of the images. In these and other embodiments, the perspective transformation matrices using the rectangle 412 as the known object may be combined (e.g., by averaging the values of the various matrix components).

A similar process may be followed using the trapezoid 413a as the known object to derive the perspective transformation matrix, which may yield the image 410d with the square 411d, the rectangle 412d, the trapezoid 413d, and the parallelogram 414d.

After obtaining the various perspective transformation matrices for each individual known object (including doing so across multiple images), the perspective transformation matrices may be combined together to yield a final perspective transformation matrix. For example, the various values of the perspective transformation matrix may be averaged to yield the final perspective transformation matrix.

Using the final transformation matrix, the final image 410e may be generated that includes the square 411e, the rectangle 412e, the trapezoid 413e, and the parallelogram 414e.

Modifications, additions, or omissions may be made to the operation 400 without departing from the scope of the disclosure. For example, the designations of different elements in the manner described is meant to help explain concepts described herein and is not limiting. Further, the operation 400 may include any number of other elements or may be implemented within other systems or contexts than those described.

Figure 5:
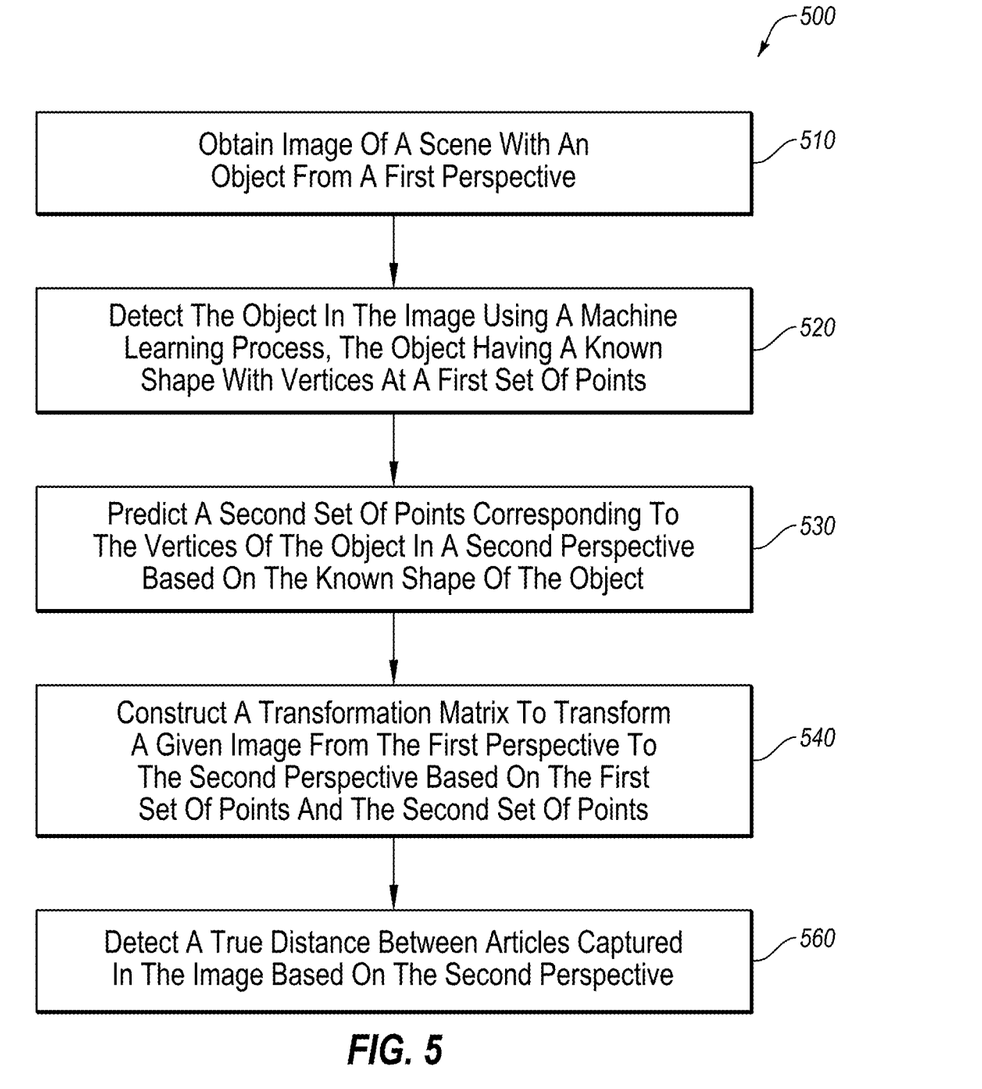
FIG. 5 illustrates a flowchart of an example method of performing a perspective transformation.

FIG. 5 illustrates a flowchart of an example method 500 of performing a perspective transformation, in accordance with one or more embodiments of the present disclosure. One or more operations of the method 500 may be performed by a system or device, or combinations thereof, such as the system 100 and/or the computing device 110 of FIG. 1. Although illustrated as discrete blocks, various blocks of the method 600 may be divided into additional blocks, combined into fewer blocks, or eliminated, depending on the desired implementation.

At block 510, an image of a scene from a first perspective that includes an object in the scene may be obtained. For example, a computing device (such as the computing device 110 of FIG. 1) may use a camera or other digital image capturing device to obtain the image.

At block 520, the object may be detected in the image using a machine learning process. For example, the computing device may utilize a YOLACT or R-CNN image sequencing technique to identify each instance of objects within the image. In these and other embodiments, the object may include a known object with a known shape that includes at least four vertices of known relative dimensions at a first set of points. Additionally, at least three of the vertices may be non-collinear.

At block 530, a second set of points may be automatically predicted corresponding to the vertices of the object in a second perspective based on the known shape of the object. For example, the computing device may designate a first point of the set of points as the origin and identify coordinate points for the other vertices according to the first perspective. The computing device may estimate a pixel projection of the other vertices by holding the origin point the same between the first perspective and the second perspective, and projecting a number of pixels to be offset based on the known shape (e.g., the pixel relative distance), thereby obtaining the second set of points according to the second perspective. In these and other embodiments, the block 530 may be performed without user input to manually designate the second set of points.

At block 540, a perspective transformation matrix may be constructed that transforms a given image from the first perspective to the second perspective. In these and other embodiments, the perspective transformation matrix may be based on the first set of points and the second set of points in a linear solving of an equation using the four sets of points in each perspective and the perspective transformation matrix. In these and other embodiments, the block 540 may be performed without user input to derive the perspective transformation matrix.

At block 550, a true distance (such as a true ground distance) may be detected between articles captured in the image based on the second perspective according to the perspective transformation matrix. For example, the perspective transformation matrix may be applied to the first image to obtain a second image representative of the first image from a second perspective, such as a top-down view. The distance between two articles may be detected using the second image from the second perspective.

Modifications, additions, or omissions may be made to the method 500 without departing from the scope of the disclosure. For example, the operations of the method 500 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 6:
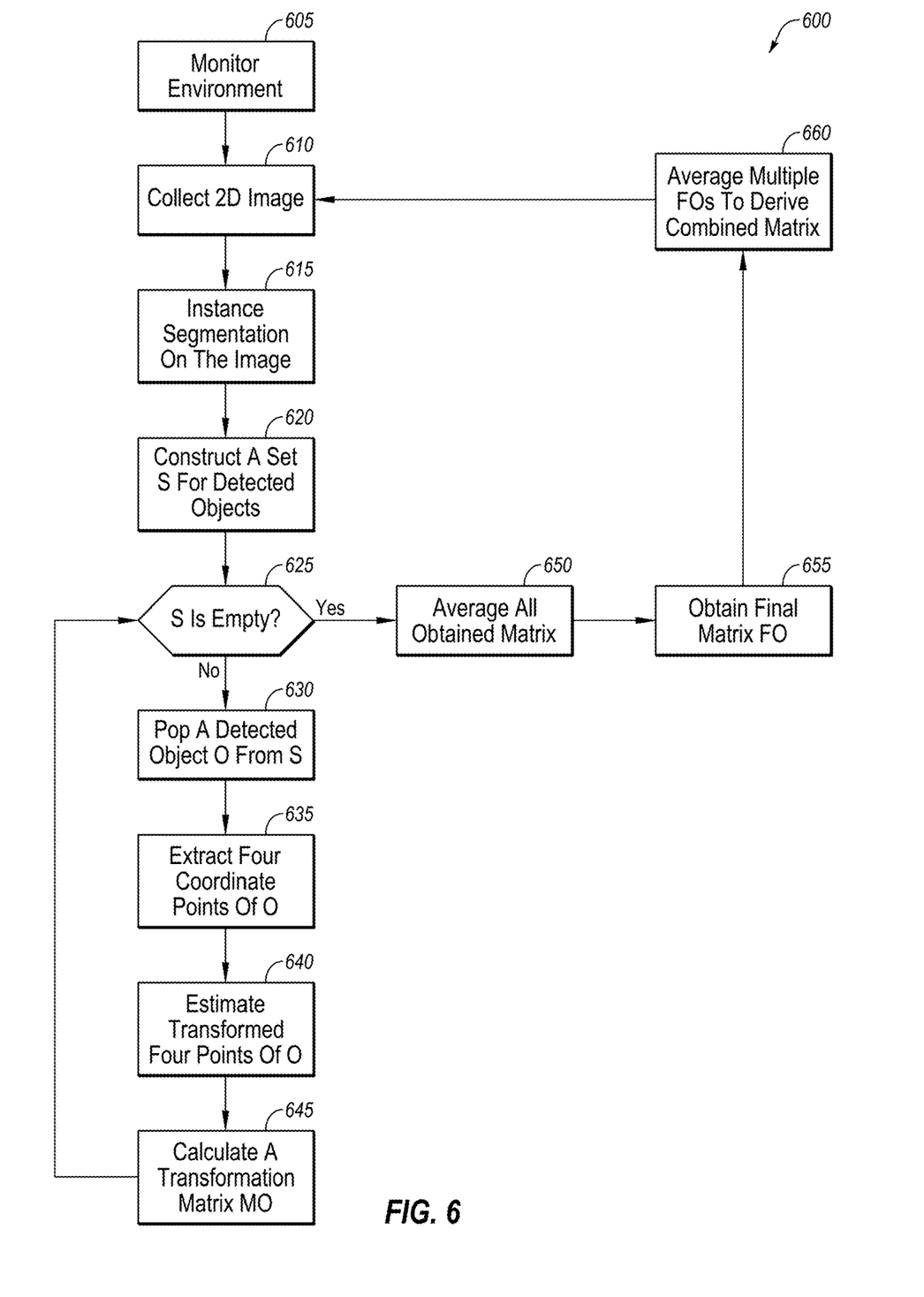
FIG. 6 illustrates a flowchart of an example method of perspective transformation utilizing multiple objects and/or images.

FIG. 6 illustrates a flowchart of an example method 600 of perspective transformation utilizing multiple objects and/or images, in accordance with one or more embodiments of the present disclosure. One or more operations of the method 600 may be performed by a system or device, or combinations thereof, such as the system 100 and/or the computing device 110 of FIG. 1. Although illustrated as discrete blocks, various blocks of the method 600 may be divided into additional blocks, combined into fewer blocks, or eliminated, depending on the desired implementation.

At block 605, an environment may be monitored. For example, a region or area may be identified as one in which a perspective may be desirable or helpful (such as a building lobby in which social distancing is to be monitored).

At block 610, a dimensional image may be collected. For example, a computing device may capture one or more images of the environment. In some embodiments, such an image may include a roadway and/or vehicles thereon. In some embodiments, the image capturing device may be moving (in which case images within a threshold time of each other for a given speed may be considered while others outside of the threshold proximity may be excluded), or may be stationary (in which case any number of images may be captured and utilized).

At block 615, instance segmentation may be performed on the image to identify each instance of objects and/or articles within the image. For example, a machine learning process may be utilized to perform the instance segmentation.

At block 620, a set S may be constructed for detected objects. For example, the objects detected in the block 615 that are of a known relative dimension and/or shape with at least four vertices may be added to the set S.

At block 625, a determination may be made whether the set S is empty. If the set S is empty (e.g., all of the known objects have been analyzed), the method 600 may proceed to the block 650. If the set S is not empty (e.g., not all of the known objects have been analyzed), the method 600 may proceed to the block 630.

At block 630, a detected object O may be popped from the set S. For example, a next object may be selected for analysis and removed from the set S.

At block 635, four coordinate points of the object O may be extracted. For example, one point may be set as an origin and the coordinate points of three or more other vertices may be extracted from the image collected at the block 610 and as identified in the block 615.

At block 640, the four points of O after transformation are estimated. For example, the location of the four points extracted at the block 635 in the desired perspective may be estimated based on the known shape and/or relative dimensions of the known object O. In some embodiments, the block 640 may be performed automatically (e.g., without user input to identify the location of the four points in the desired perspective).

At block 645, a transformation matrix MO may be calculated. For example, using the four sets of points from the original and the desired perspective, the perspective transformation matrix between the two may be derived. In some embodiments, the block 645 may be performed without user input. After the block 645, the method 600 may return to the block 625 to determine if there are additional objects in the set S for which perspective transformation matrices are to be determined.

At block 650, after all of the objects O in the set S have been analyzed (e.g., have had corresponding transformation matrices MO determined), the average may be taken of all (or a subset of all) of the matrices may be taken. For example, for the matrices MO, each of the matrix elements may be averaged. As another example, a subset (e.g., the median 2-3 matrices may be averaged), or any other combination of some or all of the matrices may be obtained.

At block 655, a final matrix FO may be obtained. For example, the final matrix FO may include the combined and/or averaged values across the matrices and the final matrix FO may represent the combination thereof into a single matrix usable for the perspective transformation.

At block 660, multiple FOs (e.g., the final matrices from multiple distinct images) may be averaged to derive a combined transformation matrix. For example, the final matrix FO associated with one image may be averaged with the final matrix FO associated with another image to derive the combined transformation matrix between both images. After the block 660, the method 600 may return to the block 610 to collect additional images for additional refinement of the combined transformation matrix.

In some embodiments, after a certain number of iterations, fewer images may be captured, or images may no longer be captured altogether. For example, the perspective transformation matrix may have achieved a desired level of accuracy. To maintain the desired level, a periodic image may be captured to verify the accuracy of the final combined transformation matrix representative of the perspective transformation matrix. If there is a deviance beyond a threshold in the matrices derived from these periodic images, the system may re-engage and again capture a series of images to derive and/or refine the perspective transformation matrix.

Modifications, additions, or omissions may be made to the method 600 without departing from the scope of the disclosure. For example, the operations of the method 600 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 7:
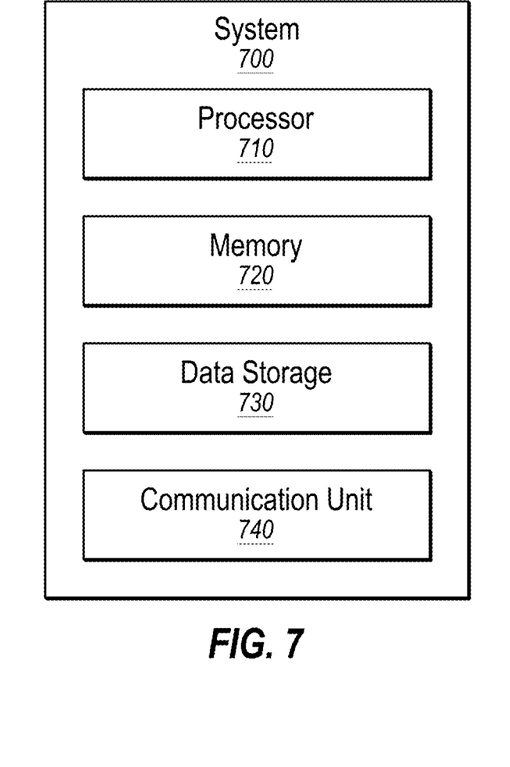
FIG. 7 illustrates an example computing system.

FIG. 7 illustrates an example computing system 700, according to at least one embodiment described in the present disclosure. The computing system 700 may include a processor 710, a memory 720, a data storage 730, and/or a communication unit 740, which all may be communicatively coupled. Any or all of the system 100 of FIG. 1 may be implemented as a computing system consistent with the computing system 700.

Generally, the processor 710 may include any computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described in the present disclosure. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions, such as instructions to perform any of the methods 500 and/or 600 of FIGS. 5 and 6, respectively. For example, the processor 710 may obtain an image of an object, and convert the image into alternative perspective, etc.

The memory 720 and the data storage 730 may include computer-readable storage media or one or more computer-readable storage mediums for carrying or having computer-executable instructions or data structures stored thereon. Such computer-readable storage media may be any available media that may be accessed by a computer, such as the processor 710. In some embodiments, the computing system 700 may or may not include either of the memory 720 and the data storage 730.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures. Combinations of the above may also be included within the scope of computer-readable storage media. Computer-executable instructions may include, for example, instructions and data configured to cause the processor 710 to perform a certain operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

One skill in the art, after reviewing this disclosure, may recognize that modifications, additions, or omissions may be made to the system 700 without departing from the scope of the present disclosure. For example, the system 700 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   obtaining an image of a scene from a first perspective, the image including an object;
   detecting the object in the image using a machine learning process, the object including a known shape with at least four vertices at a first set of points;
   automatically predicting a second set of points corresponding to the at least four vertices of the object in a second perspective of the scene based on the known shape of the object and a pixel relative distance between the first set of points based on the known shape; and
   constructing, without user input, a transformation matrix to transform a given image from the first perspective to the second perspective based on the first set of points and the second set of points.

2. The method of claim 1, further comprising:
   detecting a second object in the image using the machine learning process, the second object including a second known shape with at least four second object vertices at a third set of points;
   automatically predicting a fourth set of points corresponding to the at least four second object vertices in the second perspective of the scene based on the second known shape of the second object;
   constructing, without the user input, a second transformation matrix to transform the given image from the first perspective to the second perspective based on the third set of points and the fourth set of points; and
   averaging the transformation matrix and the second transformation matrix to obtain a final transformation matrix of the image.

3. The method of claim 2, further comprising:
   obtaining a second image of the scene from the first perspective, the second image including the object and the second object;
   detecting the object and the second object in the second image using the machine learning process, including identifying a fifth set of points corresponding to the at least four vertices of the object in the second image and a seventh set of points corresponding to the at least four second object vertices of the second object in the second image;
   automatically predicting a sixth set of points corresponding to the at least four vertices of the object in the second perspective based on the known shape of the object;
   automatically predicting an eighth set of points corresponding to the at least four second object vertices in the second perspective based on the second known shape of the second object;
   constructing, without the user input, a third transformation matrix to transform the given image from the first perspective to the second perspective based on the fifth set of points and the sixth set of points;
   constructing, without the user input, a fourth transformation matrix to transform the given image from the first perspective to the second perspective based on the seventh set of points and the eighth set of points;
   averaging the third transformation matrix and the fourth transformation matrix to obtain a final transformation matrix of the second image; and
   averaging the final transformation matrix of the image and the final transformation matrix of the second image to obtain a combined transformation matrix.

4. The method of claim 1, wherein the image is obtained via a machine vision system, the method further comprising detecting a true distance between articles captured in the image based on the second perspective.

5. The method of claim 1, wherein the machine learning process includes one of Mask region convolutional neural network (R-CNN) or You Only Look At CoefficienTs (YOLACT) instance segmentation to identify each instance of articles in the image.

6. The method of claim 1, wherein obtaining the image includes capturing one or more images using a monocular camera.

7. The method of claim 1, wherein the second perspective includes one of a top-down perspective or a front-view perspective.

8. One or more non-transitory computer readable media containing instructions that, when executed by one or more processors, cause a system to perform operations, the operations comprising:
- obtaining an image of a scene from a first perspective, the image including an object;
- detecting the object in the image using a machine learning process, the object including a known shape with at least four vertices at a first set of points;
- automatically predicting a second set of points corresponding to the at least four vertices of the object in a second perspective of the scene based on the known shape of the object and a pixel relative distance between the first set of points based on the known shape; and
- constructing, without user input, a transformation matrix to transform a given image from the first perspective to the second perspective based on the first set of points and the second set of points.

9. The one or more non-transitory computer readable media of claim 8, the operations further comprising:
- detecting a second object in the image using the machine learning process, the second object including a second known shape with at least four second object vertices at a third set of points;
- automatically predicting a fourth set of points corresponding to the at least four second object vertices in the second perspective of the scene based on the second known shape of the second object;
- constructing, without the user input, a second transformation matrix to transform the given image from the first perspective to the second perspective based on the third set of points and the fourth set of points; and
- averaging the transformation matrix and the second transformation matrix to obtain a final transformation matrix of the image.

10. The one or more non-transitory computer readable media of claim 9, the operations further comprising:
- obtaining a second image of the scene from the first perspective, the second image including the object and the second object;
- detecting the object and the second object in the second image using the machine learning process, including identifying a fifth set of points corresponding to the at least four vertices of the object in the second image and a seventh set of points corresponding to the at least four second object vertices of the second object in the second image;
- automatically predicting a sixth set of points corresponding to the at least four vertices of the object in the second perspective based on the known shape of the object;
- automatically predicting an eighth set of points corresponding to the at least four second object vertices in the second perspective based on the second known shape of the second object;
- constructing, without the user input, a third transformation matrix to transform the given image from the first perspective to the second perspective based on the fifth set of points and the sixth set of points;
- constructing, without the user input, a fourth transformation matrix to transform the given image from the first perspective to the second perspective based on the seventh set of points and the eighth set of points;
- averaging the third transformation matrix and the fourth transformation matrix to obtain a final transformation matrix of the second image; and
- averaging the final transformation matrix of the image and the final transformation matrix of the second image to obtain a combined transformation matrix.

11. The one or more non-transitory computer readable media of claim 8, wherein the image is obtained via a machine vision system, the operations further comprising detecting a true distance between articles captured in the image based on the second perspective.

12. The one or more non-transitory computer readable media of claim 8, wherein the machine learning process includes one of Mask region convolutional neural network (R-CNN) or You Only Look At CoefficienTs (YOLACT) instance segmentation to identify each instance of articles in the image.

13. The one or more non-transitory computer readable media of claim 8, wherein obtaining the image includes capturing one or more images using a monocular camera.

14. The one or more non-transitory computer readable media of claim 8, wherein the second perspective includes one of a top-down perspective or a front-view perspective.

15. A machine vision system comprising:
- a monocular camera;
- one or more processors; and
- one or more non-transitory computer readable media containing instructions that, when executed by the one or more processors, cause the machine vision system to perform operations, the operations comprising:
  - obtaining an image of a scene from a first perspective as captured by the monocular camera, the image including an object;
  - detecting the object in the image using a machine learning process, the object including a known shape with at least four vertices at a first set of points;
  - automatically predicting a second set of points corresponding to the at least four vertices of the object in a second perspective of the scene based on the known shape of the object and a pixel relative distance between the first set of points based on the known shape;
  - constructing, without user input, a transformation matrix to transform a given image from the first perspective to the second perspective based on the first set of points and the second set of points; and
  - outputting a transformed image from the second perspective based on applying the transformation matrix to pixels of the image.

16. The machine vision system of claim 15, the operations further comprising:
- detecting a second object in the image using the machine learning process, the second object including a second known shape with at least four second object vertices at a third set of points;
- automatically predicting a fourth set of points corresponding to the at least four second object vertices in the second perspective of the scene based on the second known shape of the second object;
- constructing, without the user input, a second transformation matrix to transform the given image from the first perspective to the second perspective based on the third set of points and the fourth set of points; and
- averaging the transformation matrix and the second transformation matrix to obtain a final transformation matrix of the image.

17. The machine vision system of claim 16, the operations further comprising:
  obtaining a second image of the scene from the first perspective from the monocular camera, the second image including the object and the second object;
  detecting the object and the second object in the second image using the machine learning process, including identifying a fifth set of points corresponding to the at least four vertices of the object in the second image and a seventh set of points corresponding to the at least four second object vertices of the second object in the second image;
  automatically predicting a sixth set of points corresponding to the at least four vertices of the object in the second perspective based on the known shape of the object;
  automatically predicting an eighth set of points corresponding to the at least four second object vertices in the second perspective based on the second known shape of the second object;
  constructing, without the user input, a third transformation matrix to transform the given image from the first perspective to the second perspective based on the fifth set of points and the sixth set of points;
  constructing, without the user input, a fourth transformation matrix to transform the given image from the first perspective to the second perspective based on the seventh set of points and the eighth set of points;
  averaging the third transformation matrix and the fourth transformation matrix to obtain a final transformation matrix of the second image; and
  averaging the final transformation matrix of the image and the final transformation matrix of the second image to obtain a combined transformation matrix.

\* \* \* \* \*